United States Patent
Neugebauer

[15] 3,659,474
[45] May 2, 1972

[54] WORM GEAR FOR DRIVING MACHINE-TOOL SLIDES, IN PARTICULAR IN MILLING MACHINES

[72] Inventor: Heinz Neugebauer, Weidach, Germany

[73] Assignee: Werkzeugmaschinenfabrik Adolf Waldrich Coburg, Coburg Bagern, Germany

[22] Filed: July 6, 1970

[21] Appl. No.: 52,605

[30] Foreign Application Priority Data

July 11, 1969 Germany........................P 19 35 428.0

[52] U.S. Cl..................................74/424.6, 74/409, 74/440
[51] Int. Cl........................................F16h 1/18, F16h 55/18
[58] Field of Search....................74/424.6, 409, 440, 424.8 A

[56] References Cited

UNITED STATES PATENTS

| | | | |
|---|---|---|---|
| 3,448,631 | 6/1969 | Sullivan | 74/424.6 X |
| 3,448,632 | 6/1969 | Rumbarger | 74/409 X |

*Primary Examiner*—Leonard H. Gerin
*Attorney*—Woodhams, Blanchard and Flynn

[57] ABSTRACT

Worm gear for driving machine-tool slides, in particular in milling machines, and consisting of two coaxially arranged worms meshing with a worm rack and driven by a common shaft. Each worm is separately mounted so that is is radially and axially stationary and the worms are each driven by a common axially movable compensating shaft in each case through a like pair of helical-toothed gear wheels with an equal-sized, but oppositely directed, lead angle.

10 Claims, 4 Drawing Figures

INVENTOR
HEINZ NEUGEBAUER

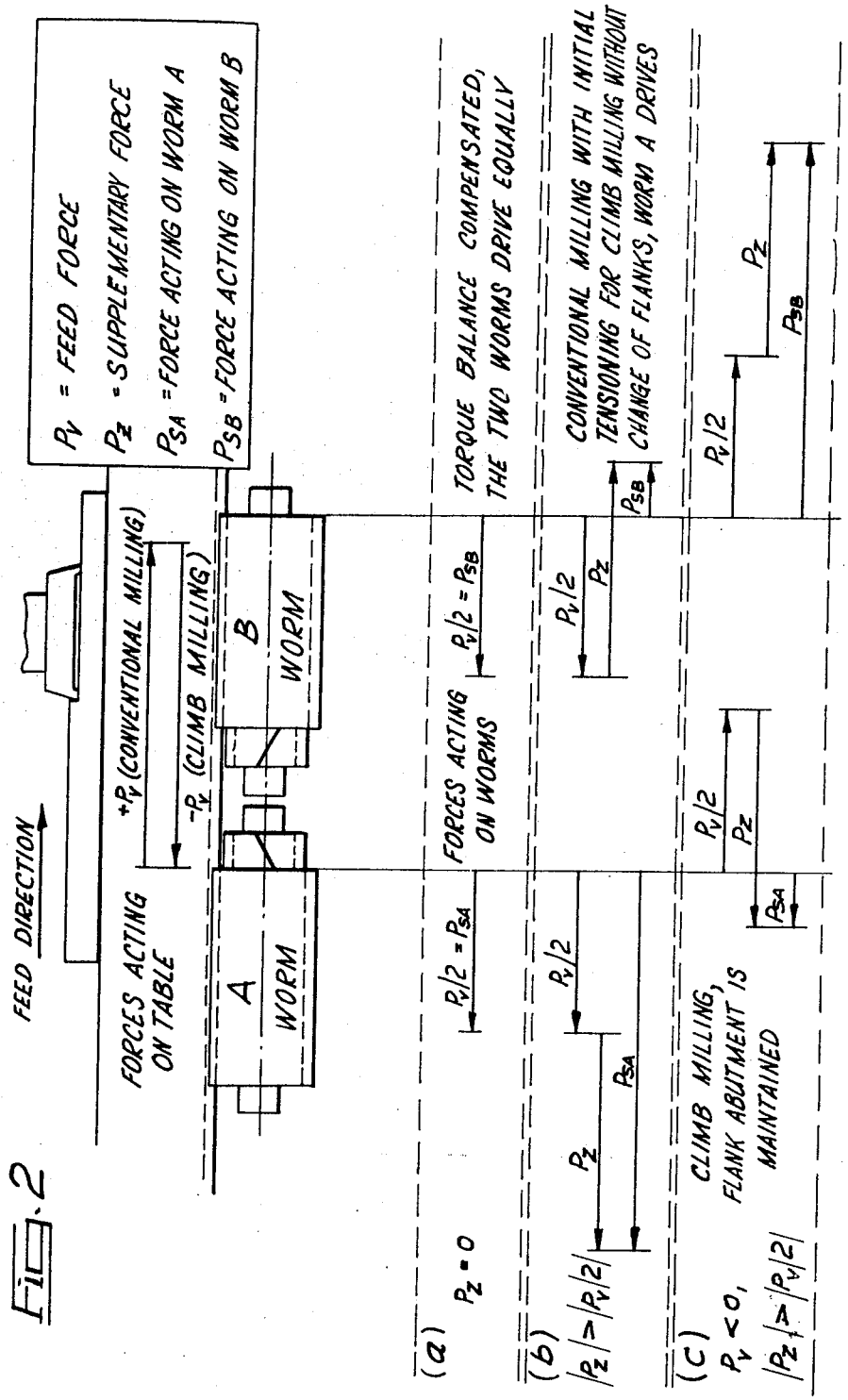

WORM GEAR FOR DRIVING MACHINE-TOOL SLIDES, IN PARTICULAR IN MILLING MACHINES

The invention relates to a worm gear for driving machine-tool slides, in particular in milling machines, and consisting of two coaxially arranged worms meshing with a worm rack. The invention also relates to a method of driving such slides free form backlash, using the gear according to the invention.

For driving milling machines, in particular, it is known to employ two worms meshing with a worm rack, the second worm being mechanically or hydraulically braced with respect to the fixedly arranged first worm, so that the right and left flanks are brought into abutment at times. Such backlash compensating devices are required in milling machines for climb milling and also when the machine-tool slide must not have any reversing backlash on reversal of direction, for example as in duplicating control systems or numerical path control systems. The known worm gears or drives have the disadvantage that the total feed force always acts on the fixedly arranged worm. With large feed forces, the result is then a short life of the axial bearings of the worm, which bearings cannot, for constructional reasons, be chosen larger in external diameter than the root diameter of the worm. On the other hand, large worm diameters are disadvantageous for reasons of cost and construction, in particular because of the higher sliding speed, which results in pronounced heating and wear. Moreover, in known gears, the drive is effected in one direction by means of the fixedly arranged worm and in the opposite direction by means of the adjustably arranged worm, if there is to be prevention of an inadmissible change in flank abutment through bracing. A lesser rigidity is thereby necessarily obtained through the initial tensioning arrangement for the operation in the opposite direction. This disadvantage not only has an unfavorable effect on the machining or removal of metal, but, because of the different rigidities in the two feed directions, leads to difficulties in achieving optimum regulation of the drive.

The problem underlying the present invention is to provide a gear in which the driving forces are better apportioned between the two worms, in particular in conventional or upcut milling, and which consequently has a longer life both as regards its worms and as regards its bearings. According to the invention, this is achieved in that each worm is separately mounted so that it is radially and axially stationary and the worms are each driven by a common axially movable compensating shaft in each case through a like pair of helical-toothed gear wheels with an equal-sized, but oppositely directed, lead angle. If, in this arrangement, a larger torque acts for any reason on one of the worms, this results in a shifting of the compensating shaft in consequence of the helical-toothed gear wheel cooperating with this worm. Due to the oppositely directed inclination of the teeth of the other pair of gear wheels, this shifting of the compensating shaft produces an additional turning movement of the second worm, as a result of which a greater torque than before is now transmitted through the second worm. In this process, the axially movable compensating shaft so adjusts itself that an equal torque is transmitted to both worms. The two worms and also their associated bearings are thereby subjected to a uniform load and they consequently have a long life, even with large feed forces. This advantage has its effect not only in conventional milling, but also in climb milling on large milling machines, in which the feed forces in the case of heavy workpieces are produced predominantly by the table friction, which always acts opposite to the feed direction. Moreover, no "pulling through" of the table by the machining force component acting in the feed direction need be feared in this case in conventional milling. The high feed force can be apportioned uniformly by the compensating shaft between the two worms and, consequently, between the axial bearings and the driving gear wheels. The worms can have short bearings and thereby be mounted rigidly and the forces producing a forcing away are absorbed in four radial bearings. Moreover, manufacturing errors in the pitch of the worm rack or the worms and changes in length due to wear or temperature are compensated for by the two worms.

In the case of light workpieces, on the other hand, the relatively low table friction in climb milling may be overcome by the large machining force component acting in the feed direction. As a further development of the idea of the invention, in order to prevent this and also be able to use the gear according to the invention with advantage in this instance, a worm gear is to be provided which has a backlash compensating device producing a mutual bracing of the worms.

To this end, as a further development of the idea of the invention, there is provided for the purpose of bracing the worms an adjusting arrangement connected to the compensating shaft in an axially immovable fashion and by means of which an axial force which is almost independent of load and distance can be exerted on the compensating shaft optionally in one axial direction or the other. If an external axial force is exerted on the compensating shaft by means of the adjusting arrangement, torques which are no longer equal, but different, are transmitted to the two worms. Whereas in the case of an equalization of torque, one-half of the feed force is applied by each of the worms, a different distribution of force is obtained when an axial adjusting force acts on the compensating shaft by the proportion of the feed force for one worm being increased by a certain supplementary force in accordance with the value of the adjusting force, while that of the other worm is reduced by the same amount. If the supplementary force is greater than one-half of the necessary total feed force, the resultant force acts opposite to the feed direction in the case of the load-relieved worm and the flanks of this worm change their abutment. The two worms are now braced in relation to one another without any backlash or play by the difference of the supplementary force and one-half of the feed force. In this way, climb milling is possible with the further-developed gear according to the invention, loads similar to those occuring in the known constructions being obtained. In conventional milling, however, considerably smaller worm loads are obtained in the braced state in the further-developed form of the gear according to the invention than in the known constructions.

Further advantages and developments of the gear according to the invention and its application in various working methods are described in detail hereinafter with reference to the drawing.

In the drawing:

FIGS. 2a, 2b and 2c are graphic representations of the forces acting in various operating states in the gear according to the invention.

Figure 1:
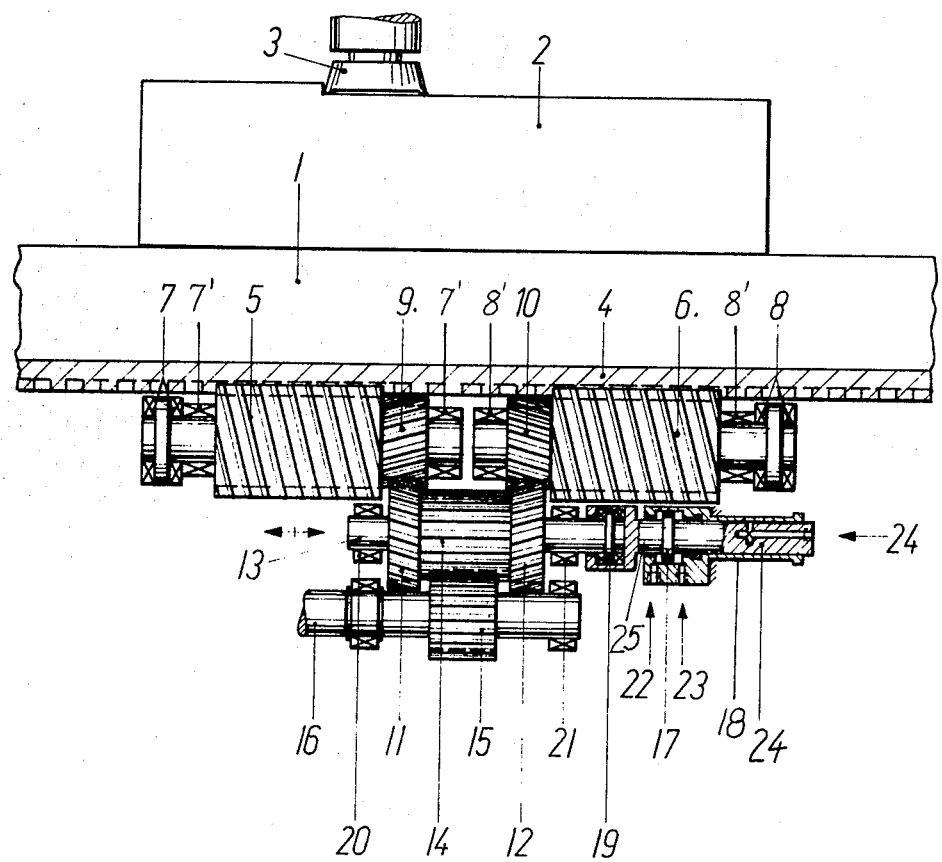
FIG. 1 is a diagrammatic representation of the gear according to the invention.

In FIG. 1 of the drawing, the gear according to the invention is illustrated with the aid of a table drive for a milling machine. The table 1 carries the workpiece 2 which is moved towards or into the milling tool 3. Secured to the underside of the table is the worm rack 4 with which the two worms 5 and 6 mesh. The worm 5 is mounted separately by means of a bilaterally acting axial bearing 7 and by means of radial bearings 7'. The worm 6 is mounted separately by means of corresponding bearings 8 and 8'. Each worm is connected to a helical-toothed driving gear 9, 10. These gears 9, 10 mesh with two like gears 11, 12. In the helical-toothed pairs of gear wheels 9, 11 and 10, 12, respectively, the lead angle is of equal size, but oppositely directed. The gear wheels 11, 12 are arranged fixedly on the compensating shaft 13. This compensating shaft is mounted so that it is axially movable in the bearings 20, 21. The compensating shaft 13 is driven from the transmission shaft 16 through the straight-toothed gear wheels 14 and 15. If necessary, the transmission shaft 16 could also be arranged coaxially with the compensating shaft 13, but a clutch or coupling which allows an axial movement of the compensating shaft 13 would then have to be provided between the two shafts.

As a result of the design of the gear which has been described so far, equal torques are transmitted to the two worms 5, 6 due to the slidable compensating shaft 13. This is moreover shown in FIG. 2a.

By exerting an axial force on the compensating shaft 13, the gear can also be so adjusted, however, that different torques are transmitted by the worms 5, 6. To this end, an adjusting arrangement 17 is provided which enables an axial force which is almost independent of load and distance to be exerted on the compensating shaft 13 optionally in one axial direction or the other. A double-acting hydraulic piston and cylinder unit as shown in the drawing is particularly suitable for this purpose. This piston and cylinder unit 17 is arranged with advantage coaxially with the compensating shaft 13, the piston rod 25 thereof being so connected to the compensating shaft 13 through axial bearings 19 that it is movable rotatably and free from axial play. By applying a pressure differential to the connections 22, 23, the piston rod 25 can be shifted in an axial direction and an adjusting force can thereby be exerted on the compensating shaft 13.

For reasons which are explained in detail hereinafter, it is moreover advantageous to provide a locking device 18 which permits axial locking of the compensating shaft. The locking device advantageously consists of an expansion cylinder 18 known per se surrounding the piston rod 25 and to which hydraulic pressure can be applied, the cylinder bearing against the piston rod 25 under initial tension in the pressureless state. If, however, pressure is admitted at the connection 24, the expansion cylinder lifts away from the piston rod 25 and consequently releases it for displacement.

This gear which has been described can be used for various working methods. For torque equalization between the worms 5 and 6, as is desirable with large feed forces, in conventional milling and in climb milling of heavy workpieces, pressure is merely admitted at the connection 24. The compensating shaft can move freely and produces an equalization of torque between the worms 5 and 6.

If, on the other hand, the connection 24 is pressureless the expansion cylinder 18 holds the piston rod 25 and, consequently, the compensating shaft 13 fast axially. This is advantageous in mounting and maintenance work and also when operation is carried out with a double table. If one of the tables is to be moved into its parking position or fetched therefrom, the driving table may also be moved so far that its rack 4 leaves one of the two worms. In this way, rack, table and bed length is saved.

In order to prevent "pulling through" of the table in climb milling, it is necessary to produce a supplementary force in the gear by producing an adjusting force at the compensating shaft 13 and thereby brace the worms 5, 6 in relation to one another. To this end, the pressure differential at the connections 22, 23 is chosen of such size that the supplementary force is greater than one-half of the maximum feed force to be expected in the feed direction in climb milling. FIG. 2c shows graphically the force conditions occuring in climb milling at the worms A and B, which correspond to the worms 5, 6.

Whereas in climb milling loads similar to those occuring in known constructions are obtained at the worms, distinct advantages are obtained with the subject-matter of the invention in conventional milling with braced worms. In known constructions, the load in the case of the driving worm in conventional milling is equal to the sum of the total feed force and the initial tensioning force, while the other worms is loaded with the initial tensioning force in accordance with the maximum feed force to be expected in the feed direction in climb milling.

In the gear construction according to the invention, on the other hand, the driving worm A, in accordance with FIG. 2b, is loaded with one-half of the feed force $P_v/2$ in conventional milling, plus the supplementary force $P_z$ (supplementary force = ½ of the maximum feed force to be expected in conventional milling in the feed direction), i.e. with exactly one-half of the load compared with known constructions. The other worm B is loaded with the difference of one-half of the feed force $P_v/2$ in conventional milling and the supplementary force $P_z$. From a comparison of the two loading values it is apparent that the driving worm A is always loaded more heavily by twice the supplementary force (= maximum feed force to be expected in the feed direction in climb milling) than the other worm. If the feed force in climb milling becomes greater than twice the supplementary force, both the worms have a driving action. As the feed force in climb milling is calculated as the difference between the table friction and the machining force component in the feed direction, the supplementary forces are small in comparison with the feed forces opposite to the feed direction in conventional milling, which are obtained as the sum of the table friction and the machining force component. The ratio of the worm loads to one another approaches the value 1 all the more the greater the difference between the values of the table friction and the machining force component in the feed direction. With large workpiece weights, the worm loads are therefore almost equally divided, while with small workpiece weights the loading of the worms, considered absolutely, is lower in any case, so that it is possible to operate with initial tension without risk of overloading also in conventional milling or in climb milling with high workpiece weights, which can be regarded as facilitating operation.

Furthermore, the gear according to the invention can also be used with advantage in a working method in which the slide must reverse immediately on a change in direction without any reversing backlash occuring. This is necessary for example as in duplicating control systems or numerical path systems.

It has already been mentioned at the beginning that in known gears a lesser rigidity is obtained in the opposite direction, due to the biasing or initial tensioning device. When the gear according to the invention is employed, however, the rigidity is always equal in value in both directions. If it is desired to avoid reversing backlash, it is necessary to proceed so that the axial adjusting force exerted on the compensating shaft by means of the adjusting arrangement is maintained in value and direction on reversal of the direction of rotation of the worms and the adjusting force must be so set in value that the supplementary force produced in the gear is greater than one-half of the maximum feed force to be expected in or opposite to the driving direction. In this method of operation, for example, the worm A drives in one direction and the worm B in the other direction. The flank abutment of both worms is maintained on reversal of the direction of feed of the table. As the two worms are similarly constructed and mounted and as the adjusting arrangement is disposed on the compensating shaft and can operate with a considerable transmission of movement, the rigidity is equal in both directions. The transmission ratio between the axial shifting distance or movement of the compensating shaft and the apparent axial movement of the worm flank in consequence of rotation of the worm is:

$$\frac{s}{w} = \frac{d \cdot \pi}{h \cdot \text{tg } \beta},$$

in which
$s$ = shifting movement of the compensating shaft
$w$ = apparent axial movement of the worm flank
$\beta$ = lead angle of the gear wheel
$d$ = pitch diameter of the gear wheel on the worm axis
$h$ = axial spacing of threads (pitch) of worm As can be seen from the formula, by convenient choice of the design data, and in particular of the value tangent $\beta$, the transmission of movement and, consequently, also the reduction in force can be made as large as desired, so that the loss of rigidity through the adjusting arrangement can practically speaking be disregarded. Disturbing frictional resistances through meshing of the gear wheels to the shifting of the compensating shaft do not occur in operation owing to the simultaneous rolling action of the flanks of the gear wheels. The distribution of the load can therefore be adjusted precisely and makes possible an exact dimensioning of the entire driving system without large safety margins.

Advantages as compared with the known arrangements are obtained on a reversal of movement also when a change in the flank abutment is permitted or desirable. If, in fact, the adjusting force is reversed in direction while the table and driving gear are at a standstill, the worm teeth run through the play in the rack on the shifting of the compensating shaft and are already applied against the opposite flanks. On the starting up of the feed drive, a jolt in the teeth is prevented in this way and on regulation of the drive the detrimental dead time through gear backlash for the starting operation is avoided. The adjusting forces must naturally overcome the frictional forces of the teeth, which, however, are relatively small. In this way, one worm always remains the driving worm and can be suitably dimensioned, while the other worm, which is made shorter, serves only as an initial tensioning worm.

In the known arrangements, the table would have to be moved with the initial tensioning worm while overcoming the frictional forces of the table against the flanks of the feed worm if the unfavorable non-rigid drive by means of the initial tensioning worm is to be avoided.

The embodiments of the invention in which an exclusive property or privilege is claimed are defined as follows:

1. Gearing for driving machine tool slides, comprising:
    a worm rack;
    a pair of coaxially arranged worms meshing with said worm rack, each worm being separately mounted so that it is radially and axially stationary and having a helical-toothed gear wheel secured thereto and rotatable therewith, said helical-toothed gears being equal in size and having opposite lead angles; and
    an axially movable compensating shaft having a pair of equally sized, helical-toothed gear wheels thereon with oppositely directed lead angles engaging said helical-toothed gears secured to said worms for driving said worm.

2. Gearing according to claim 1, including means defining a backlash compensating device for producing a mutual bracing of the worms, said backlash compensating device comprising an adjusting arrangement connected to the compensating shaft in an axially immovable manner for the purpose of bracing the worms and to thereby apply an axial force on the compensating shaft.

3. Gearing according to claim 2, wherein the adjusting arrangement consists essentially of a double-acting piston and cylinder unit.

4. Gearing according to claim 3, wherein the piston and cylinder unit is arranged coaxially with the compensating shaft and the piston rod is so connected to the compensating shaft through axial anti-friction bearings that it is movable rotatably and free from axial play.

5. Gearing according to claim 2, wherein said adjusting arrangement is adjusted so that said force on said compensating shaft is at a value wherein a supplementary force is generated which is greater than one-half of the maximum feed force in climb milling.

6. Gearing according to claim 2, wherein said adjusting arrangement is adjusted so that said axial force on said compensating shaft is at a value wherein a supplementary force is generated which is greater than one-half of the maximum feed force in the driving direction.

7. Gearing according to claim 2, wherein said adjusting arrangement is adjusted so that said axial force on said compensating shaft is at a value wherein a supplementary force is generated which is greater than one-half of the maximum feed force in a direction opposite to the driving direction.

8. Gearing according to claim 2, wherein said adjusting arrangement is adjusted so that said axial force on said compensating shaft is at a reverse value, when said slide is at a standstill during a change of direction, to effect a shift of the compensating shaft in opposition to the frictional forces of the teeth and in so doing turns the worms to such an extent that their oppositely directed flanks come into abutment in each instance with those of the worm rack to thereby prevent a jolting of the slide and to effectively eliminate dead time during the reversal of the direction of travel of the slide.

9. Gearing according to claim 1, wherein the compensating shaft is connected to a locking device for axial locking.

10. Gearing according to claim 9, wherein the locking device consists of an expansion cylinder known per se surrounding the piston rod and to which hydraulic pressure can be applied, the cylinder bearing against the piston rod under initial tension in the pressureless state.

* * * * *